United States Patent [19]

Kim

[11] Patent Number: 5,763,778
[45] Date of Patent: Jun. 9, 1998

[54] APPARATUS FOR MEASURING VEHICLE SPEED

[75] Inventor: Dong-Yoon Kim, Seoul, Rep. of Korea

[73] Assignee: KIA Motors Corporation, Seoul, Rep. of Korea

[21] Appl. No.: 682,236

[22] Filed: Jul. 17, 1996

[30] Foreign Application Priority Data

May 7, 1996 [KR] Rep. of Korea ............... 1996-14803

[51] Int. Cl.$^6$ ........................................... G01P 3/36
[52] U.S. Cl. ..................... 73/488; 250/231.14; 324/175
[58] Field of Search .................. 73/488, 514.26; 324/175; 250/231.14, 231.16, 231.13, 231.17, 231.18

[56] References Cited

U.S. PATENT DOCUMENTS

| | | | |
|---|---|---|---|
| 3,096,444 | 7/1963 | Seward | 324/175 |
| 3,098,152 | 7/1963 | Von Mathes | 324/175 |
| 3,912,926 | 10/1975 | Coulbourn | 324/175 |
| 5,103,213 | 4/1992 | Marsh et al. | 324/175 |

*Primary Examiner*—Christine K. Oda

[57] ABSTRACT

An apparatus for measuring vehicle speed is disclosed. The apparatus includes a pair of disk plates having a circular opening in a central part through which a final output shaft of a transmission passes by a plurality of long-shaft bolts with the plates being mounted to the final output shaft of the transmission by the plurality of long-shaft bolts. A plurality of reinforcement ribs are provided for coupling the pair of disk plates to each other with the ribs being arranged to be in an equal interval along the direction of the circumference of the disk plates in order to maintain a constant interval between the disk plates. A bracket is mounted around the disk plates with the bracket having a groove for receiving a circumferential section of the disk plates. A photosensor is mounted on the side of the bracket in order to sense a passing of the reinforcement ribs during a revolution of the disk plates with the photo-sensor applying a pulse signal to a controller of a vehicle control system generated by sensing the passing of the reinforcement ribs.

1 Claim, 2 Drawing Sheets

APPARATUS FOR MEASURING VEHICLE SPEED

FIELD OF INVENTION

The present invention relates to an apparatus for measuring a vehicle speed, and more specifically an apparatus for measuring a vehicle speed wherein a photosensor for sensing a passing through of a plurality of ribs provided on a pair of revolving disk plates, and for generating a pulse signals from the passing to measure vehicle speed.

PRIOR ART

In the conventional method of measuring a vehicle speed, a magnetic-pickup is installed to a final output shaft of a transmission. As a vehicle speed signal, a signal from the transmission is outputted as four pulse signals per one revolution of the final output shaft, and is displayed on an instrument panel of a driver's seat.

In general, a vehicle is controlled by from using the signal indicating measurement of vehicle speed. However, since a pulse signal per one revolution of the final output shaft is at a low level in the conventional four-wheel steering system, the conventional four-wheel steering system generates has a lower vehicle speed signal. The conventional four-wheel steering system has a vehicle speed signal received at a low speed, namely, a cycle of the pulse signal becomes short, thereby resulting in an unstable controller or an inaccurate measurement of vehicle speed.

SUMMARY OF THE INVENTION

An object of the present invention is to provide an apparatus for measuring a vehicle speed which receives a stable low speed signal from a controller of the vehicle.

In order to achieve this object, the apparatus for measuring the vehicle speed according to the present invention includes:

- a pair of disk plates which has a circular opening in a central part through which a final output shaft of a transmission passes by a plurality of long-shaft bolts, and is mounted to the final output shaft of the transmission by the plurality of long-shaft bolts;
- a plurality of reinforcement ribs which couple the disk plates to each other, and are arranged to be an equal interval along a direction of the disk plates circumference in order to maintain a constant interval between the disk plates;
- a bracket which is mounted around the disk plates, and includes,a groove for receiving a circumference section of the disk plates; and
- a photo-sensor which is mounted in the side of the bracket in order to sense a passing of the reinforcement rib during a revolution of the disk plates, and applies a pulse signal to a controller of a vehicle control system generated by sensing the passing of the reinforcement rib.

BRIEF DESCRIPTION OF THE ATTACHED DRAWINGS

The preferred embodiment of the present invention will be understood with reference to the following detailed description, appended claims and the attached drawings, wherein:

DETAILED DESCRIPTION

A detailed description of the present invention will now be made referring to the accompanying drawings.

Figure 1:
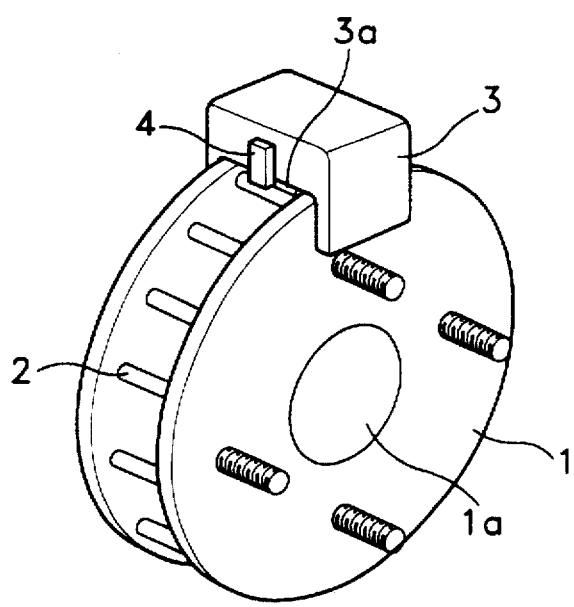
FIG. 1 is a perspective view of an apparatus for measuring a vehicle speed in accordance with a preferred embodiment of the present invention.
Figure 2:
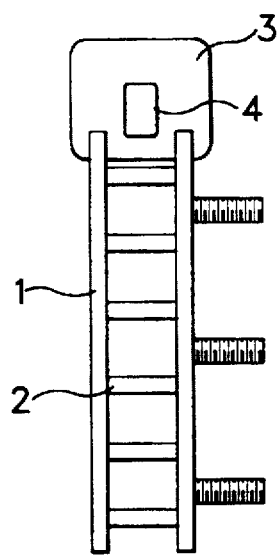
FIG. 2 is a front view of the apparatus shown in FIG. 1.

Referring to FIGS. 1 and 2, a pair of disk plates 1 are mounted to a final output shaft (not shown) of a transmission by a plurality of long-shaft bolts. The disk plates 1 have a circular opening 1a in a central part through which the final output shaft of the transmission passes. In addition, the disk plates 1 are connected to each other by using a plurality of reinforcement ribs 2 which are arranged to be an equal interval along a direction of the circumference. A constant interval between the disk plates 1 is maintained.

A bracket 3, including a groove 3a for receiving a circumference section of the disk plates 1, is mounted around the disk plates 1.

A photo-sensor 4 for sensing a passing of the reinforcement rib 2 during a revolution of the disk plates 1, is mounted on the side of the bracket 3. The photosensor 4 has a light emitting part and a light receiving part. When the reinforcement rib 2 passes through the photo-sensor 4 according to the revolution of the disk plates 1 in proportion to a revolution of the output shaft of the transmission, a light ray of the light emitting part of the photo-sensor 4, is cut off by the reinforcement rib 2. Accordingly, the photo-sensor 4 senses a passing of the reinforcement rib 2, and following, the light receiving part of the photo-sensor 4 generates a pulse signal by the output signal of the photo-sensor 4.

Thus, when a plurality of reinforcement ribs 2 pass the photo-sensor 4 during the revolution of the disk plates 1, the photo-sensor 4 senses and measures the number of passes of the reinforcement ribs 2. As a result, a vehicle speed can be measured during a vehicle's travelling at low and high speeds. The photo-sensor 4 generates a pulse signal in proportion to the vehicle speed.

Figure 3:
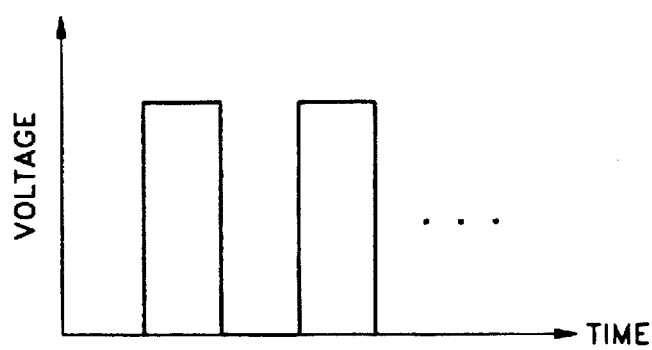
FIG. 3 shows wave-forms of a pulse signal of the apparatus for measuring the vehicle speed in accordance with a preferred embodiment of the present invention.

As shown in FIG. 3, in the apparatus for measuring the vehicle speed according to the present invention, the reinforcement ribs are provided to the disk plates at an equal interval, and are sensed by the photo-sensor. Therefore, as the ribs pass through the sensor 4 independent of low or high speed, pulse signal is generated by the sensor 4 and applied successively to a controller of a vehicle control system, thereby obtaining the accurate speed of vehicle and a stable output.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. An apparatus for measuring a vehicle speed, comprising:

a pair of disk plates having a circular opening in a central part through which a final output shaft of a transmission extends, said plates being mounted to said final output shaft with a plurality of long-shaft bolts;

a plurality of reinforcement ribs for coupling said pair of disk plates to each other with said ribs being arranged to be in an equal interval along a direction of the circumference of the disk plates in order to maintain a constant interval between said disk plates;

a bracket mounted around said disk plates with said bracket having a groove for receiving a circumferential section of said disk plates; and a photo-sensor mounted on a side of said bracket in order to sense a passing of said reinforcement ribs during a revolution of said disk plates, said photo-sensor applying a pulse signal to a controller of a vehicle control system generated by sensing the passing of reinforcement.

* * * * *